United States Patent [19]

Yamauchi et al.

[11] Patent Number: 4,881,271

[45] Date of Patent: Nov. 14, 1989

[54] PORTABLE WIRELESS COMMUNICATION SYSTEMS

[75] Inventors: Yukiji Yamauchi, Kokubunji; Nobuo Tsukamoto, Tachikawa; Masahiro Koya, Kodaira, all of Japan

[73] Assignee: Hitachi, Ltd., Tokyo, Japan

[21] Appl. No.: 153,906

[22] Filed: Feb. 9, 1988

[30] Foreign Application Priority Data

Mar. 20, 1987 [JP] Japan ................................ 62-63784
Nov. 6, 1987 [JP] Japan ................................ 62-279199

[51] Int. Cl.⁴ .............................................. H04B 1/00
[52] U.S. Cl. ........................................ 455/56; 455/33; 379/58; 379/59; 379/60
[58] Field of Search ...................... 455/33, 56, 54, 89, 455/11, 34, 53, 67, 88, 90, 226; 379/56, 58-60, 89, 90, 225

[56] References Cited

U.S. PATENT DOCUMENTS

| 3,764,915 | 10/1973 | Cox . | |
| 3,955,140 | 5/1976 | Stephens et al. | 455/11 |
| 4,163,121 | 7/1979 | Yoshikawa . | |
| 4,284,848 | 8/1981 | Frost | 455/11 |
| 4,627,107 | 12/1986 | Hohlfeld et al. | 455/11 |
| 4,669,107 | 5/1987 | Eriksson-Lennartsson | 455/33 |
| 4,726,014 | 2/1988 | Goldman | 455/33 |

FOREIGN PATENT DOCUMENTS

0126557 of 1984 European Pat. Off. .
61-244137 10/1986 Japan .
84/00654 of 1984 World Int. Prop. O. .

OTHER PUBLICATIONS

Kawasaki et al; "Lightweight Handheld Portable Cordless Telephone Set", NTT Report . . . vol. 35, No. 2, pp. 191-197.
Nishihara et al.; "Cordless Telephone Equipment Meeting CEPT Standards", NEC Res. . . ., No. 82, Jul. 1986, pp. 104-108.
Kato et al.; "Improved Cordless Telephone Set", NTT Equipment, Dec. 1985, pp. 102-108.
European Search Report; Apr. 19, 1989; for Application No. EP 88 10 1646.

*Primary Examiner*—Robert L. Griffin
*Assistant Examiner*—Curtis Kuntz
*Attorney, Agent, or Firm*—Pennie & Edmonds

[57] ABSTRACT

In portable wireless communication systems wherein subscriber stations communicate with a plurality of base stations each covering a predetermined area, communication lines are provided for dedicating to the exchange of the use status and observation result of radio channels with the plurality of base stations in order that each base station can autonomously manage the determination of a base station with which a subscriber station communicates, the selection of a radio channel to be used, and the like.

12 Claims, 8 Drawing Sheets

FIG. 6A

| # OF CHANNEL | 1 | 2 | 3 | 4 | 5 | 6 | 47 | 48 | 49 | 50 |
|---|---|---|---|---|---|---|---|---|---|---|
| OBSERVED RESULT | ○ | ○ | × | ○ | △ | × | × | ○ | △ | ○ |

○: VACANT　　△: NEGLIGIBLE INTERFER　　×: IN USE

FIG. 6B

| # OF BASE STATION \ # OF CHANNEL | 1 | 2 | 3 | 4 | 5 | 6 | 47 | 48 | 49 | 50 |
|---|---|---|---|---|---|---|---|---|---|---|
| 1 | ○ | ○ | × | ○ | △ | × | × | ○ | △ | ○ |
| 2 | ○ | ○ | × | ○ | △ | × | △ | ○ | ○ | ○ |
| 3 | ○ | ○ | × | ○ | × | × | △ | ○ | ○ | ○ |
| 4 | △ | ○ | △ | ○ | × | △ | ○ | ○ | ○ | △ |
| 5 |  |  |  |  |  |  |  |  |  |  |
| n-2 |  |  |  |  |  |  |  |  |  |  |
| n-1 |  |  |  |  |  |  |  |  |  |  |
| n |  |  |  |  |  |  |  |  |  |  |

PORTABLE WIRELESS COMMUNICATION SYSTEMS

BACKGROUND OF THE INVENTION

1. Field of the Invention

The present invention relates to portable wireless communication systems, and more particularly to portable wireless communication systems suitable for use in restricted area, e.g., indoor use in a building or the like.

2. Description of The Prior Art

To further enhance mobile telephone systems for the purpose of obtaining a broader service area of wireless telephones, so-called indoor portable wireless communication systems have been widely studied which systems allow wireless telephones to be used indoors at buildings, underground streets, airports or the like.

Different from the mobile telephone system, the characteristics of indoor portable wireless communication is available at any location within a total service area extending indoors at a building or on the premises of a factory, and that such communication is allowed to be conducted while a subscriber station is moving.

With the progress of practical use of such wireless communication systems, it may well be expected that all indoor extensions are made cordless. Thus, terminal density of indoor portable wireless communication systems may become extensively higher than that of current mobile telephone systems.

In view of the above-described background art, a technique of using the allocated radio frequency resources effectively and to the extremity has been desired. Therefore, it becomes necessary to use a small service area so that reuse efficiency of a same frequency can be improved.

Technique required for such portable wireless communication systems are basically almost analogous to those required for conventional mobile telephone systems. However, the following channel allocation and hand-off techniques are different.

One of the physical differences of indoor portable wireless communication systems from conventional mobile telephone systems is the total number of base stations. As discussed above, it becomes necessary for indoor portable wireless communication systems to install base stations at very close intervals, resulting in a very large total number of base stations.

Therefore, it is difficult for a frequency management controller installed at the center of systems to control by itself the frequency management for all the base stations.

In addition, the indoor radio propagation characteristics are often unknown. Even if they are known previously, it may be expected that they change to large extent due to a change of an indoor layout or the like. It is difficult accordingly to provide a fixed cell structure as seen in conventional mobile telephone systems, where base stations are installed systematically.

To solve the above problems, a portable wireless communication system has been proposed as in Japanese Patent Laid-open application No. JP-A-61-244137, which system performs "automatically" the management and allocation of radio frequencies or channels in such a manner that each of the base stations disposed at irregular intervals independently judges what channels are available, and determines a priority order in which the channels should be selected when used for communication with a subscriber station based on learning from the past history.

The proposed portable wireless communication system, however, performs an autonomic processing only for the operation of channel allocation. Other technical factors required for the processings before the channel allocation, such as the call initiation from a subscriber station for determining the base station which is to be communicated with the subscriber station, the hand-off of the communication exchange according to movement of a subscriber station and the like, cannot be autonomically processed without a help of the control by an additionally installed management controller.

SUMMARY OF THE INVENTION

It is a main object of the present invention to improve reuse efficiency of wireless frequency resources, i.e., to enable to use the same frequency channel as many as possible, in portable wireless communication systems used in restricted service areas.

It is another object of the present invention to realize portable wireless communication systems in which when a base station thereof autonomically performs the management and allocation of radio channels, it independently performs the call initiation from a subscriber station for determining the base station which is to be communicated with the subscriber station and the hand-off of the communication exchange according to movement of a subscriber station.

To achieve the above objects, the communication systems of this invention are constructed such that lines are provided among the base stations disposed at arbitrary intervals for exchanging beforehand control information on radio channel use status, use availability status and other internal status between each base station and its neighbouring base stations, and means is provided at each base station by which each base station autonomically performs the management of radio channels based on the exchange information.

According to the portable wireless communication systems of this invention, since each base station has the control informations on neighbouring base stations, each base station can independently judges the concerned conditions for processing hand-off and call initiation from a subscriber station and performs the following processings.

The above-mentioned and other features and objects of this invention will become more apparent by reference to the following description taken in conjunction with the accompanying drawings.

BRIEF DESCRIPTION OF THE DRAWINGS

FIGS. 6A and 6B illustrate examples of control information according to the present invention;

DESCRIPTION OF THE PREFERRED EMBODIMENTS

Figure 1:
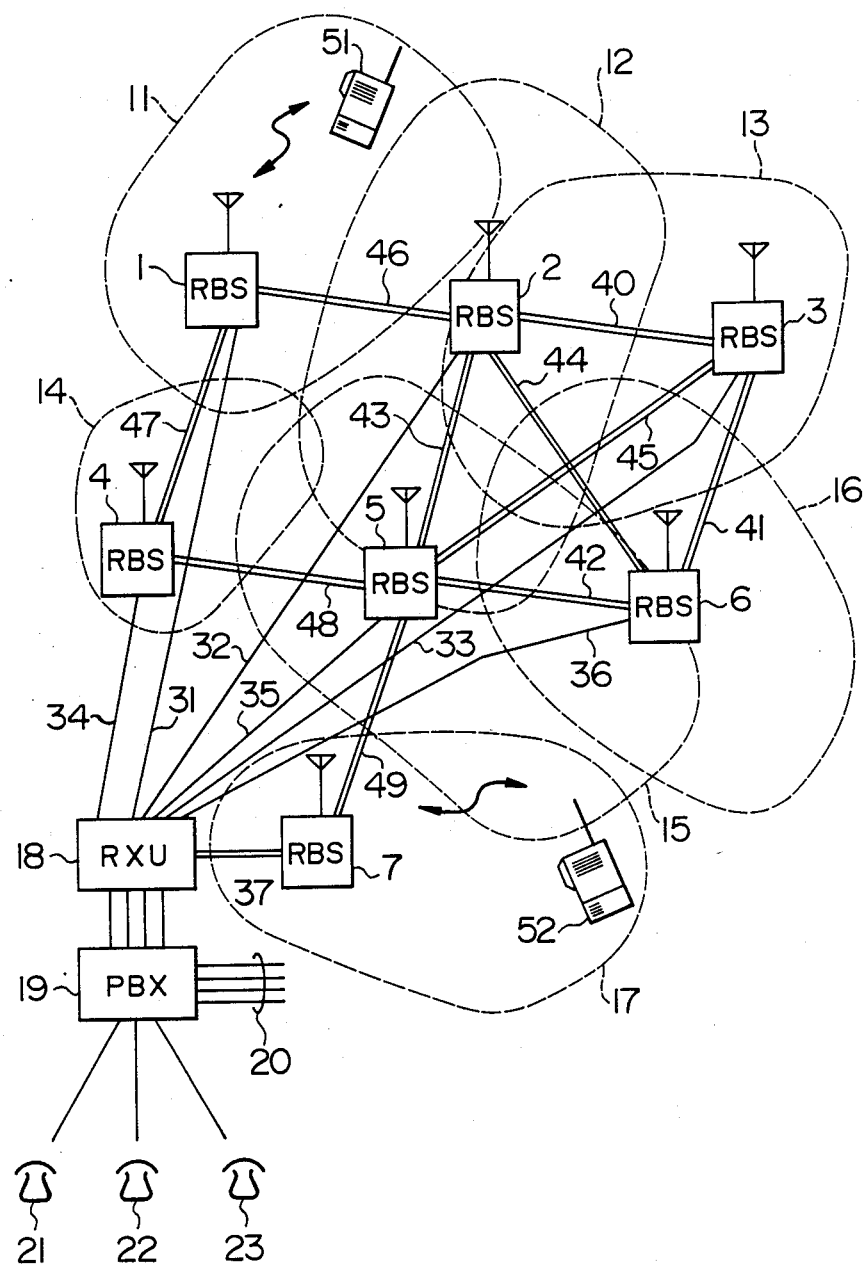
FIG. 1 is a schematic diagram showing the overall arrangement of portable wireless communication systems according to an embodiment of the present invention.

FIG. 1 shows an embodiment of the arrangement of the portable wireless communication systems of this invention.

Figure 2:
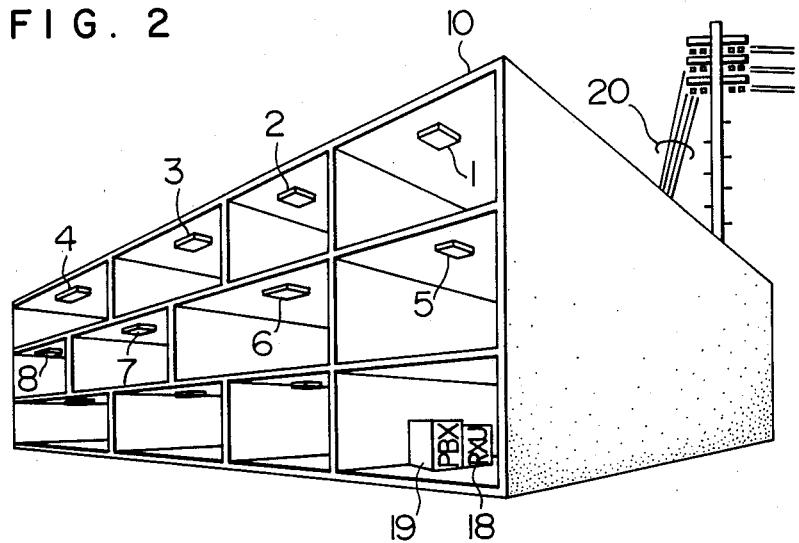
FIG. 2 is a partially broken-out perspective view of a building used for explaining the indoor portable wireless communication systems.

The base stations 1 to 7 are installed in respective rooms of a building 10 as shown in FIG. 2 and communicate at a radio intensity higher than a predetermined level in the service area 11 to 17, respectively. On the premises of a building or the like to which the present invention is principally applied, there are many materials such as walls, lockers and the like which absorb and reflect radio waves. Consequently, the shape of each service area 11 to 17 of the base station does not become an ideal circle but it takes three-dimensionally complicated configuration. In addition, it is common that the indoor layout is often so that the radio propagation characteristics and the shape of service areas change.

It is not practical to move any of the base stations 1 to 7 every time the indoor layout is changed. In view of this, to prevent an out-of-service area from being produced by any possible slight layout change, it is necessary to dispose the base stations at higher density so that the service areas of the base stations should overlap each other considerably.

Under such circumstances, subscriber stations 51 and 52 can communicate with a plurality of base stations due to the overlap of the service areas. However, when neighbouring base stations communicate with subscriber stations using the same frequency, interference between them may occurs. Also between neighbouring base stations whose service areas do not overlap, interference may occur if the distance between them is short.

Therefore, in the embodiment shown in FIG. 1, communication lines 40 to 49 are mounted between base stations 1 to 7 which have a possibility of interference therebetween. Each radio station exchanges control information on channel use status, use availability status and other internal status with other neighbouring base stations, and autonomically performs the management of radio channels based on the exchanged control information so as not to interfere with other neighbouring base stations.

Each base station 1 to 7 is connected to a radio exchange 18 via communication lines 31 to 37. The radio exchange 18 is connected to a wire exchange 19 for exchange with wire telephones 21 to 23 in the building, and further with wire telephones in other buildings via wires 20.

In this embodiment, the base stations 1 to 7 autonomically perform the radio frequency channel allocation so that the radio exchange concerns no channel allocation but only the exchange operation.

The structure and operation of each element of the embodiment shown in FIG. 1 will be described in detail.

Figure 3:
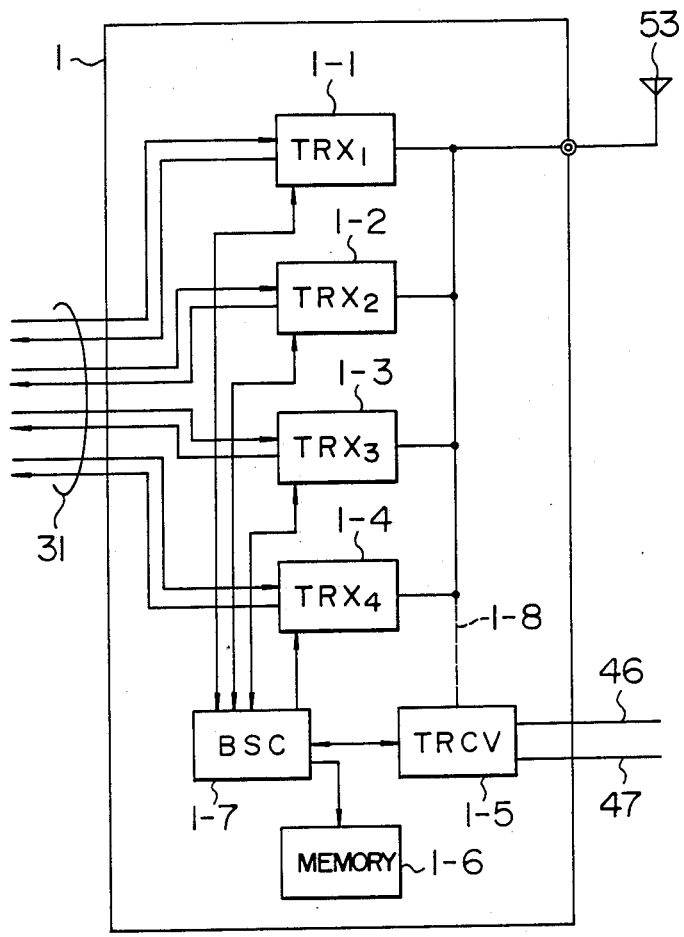
FIG. 3 shows an embodiment of a base station of the portable wireless communication systems of this invention.

FIG. 3 shows an embodiment of the structure of the base station 1. The base station 1 includes transceiver units 1-1, 1-2, 1-3 and 1-4, a data exchange transceiver 1-5, a memory 1-6, a controller 1-7. There are as many transceiver units 1-1 to 1-4 as the number of subscriber stations which can be used at the same time within the service area of the base station 1. The data exchange transceiver 1-5 is connected to lines 46 and 47 for the exchange of control information data with neighbouring base stations. The memory 1-6 stores the control information data transmitted from and received by the data exchange transceiver 1-5. The controller 1-7 (which may be constructed of a microcomputer) controls the frequency channel allocation for the plurality of transceivers 1-1 to 1-4 and the management of their operation status, by referring to the control information data stored in the memory 1-6. The transceiver units 1-1 to 1-4 communicate with the subscriber stations 51 and 52 via an antenna 53, and are connected via the communication line 31 to the radio exchange 18 and/or the wire exchange 19.

Figure 4:
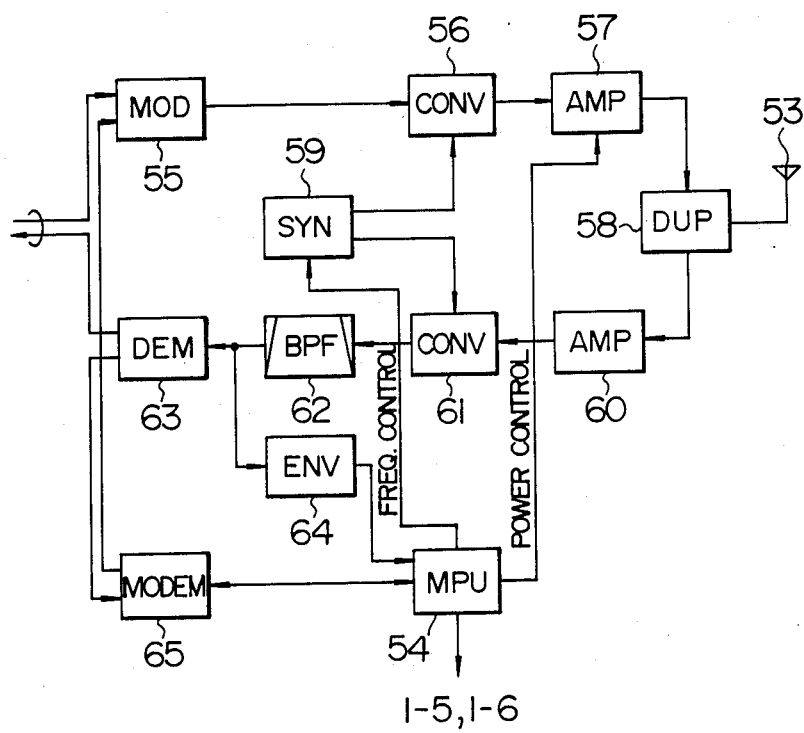
FIG. 4 shows an embodiment of a transceiver unit shown in FIG. 3.

FIG. 4 shows one example of the structure of the transceiver unit provided in the base station. In the figure, the transceiver unit includes a microprocessor unit 54, a modulator 55 for audio signals, a frequency converter 56 and a high frequency amplifier 57 whose output power may preferably be variable. The transceiver unit further includes a duplexer 58, a frequency synthesizer 59, a receiver amplifier 60, a frequency converter 61, a band-pass filter 62, a demodulator 63 for audio signals, an envelope detector 64 for received signals which is provided for measuring signal strength and interference strength during communication, and a modem 65 for sending and receiving digital control signals to and from the associated subscriber station.

The transceiver unit as constructed above is almost similar to a conventional known one, as shown in, for example, "Lightweight Handheld Portable Cordless Telephone Set" by Kawasaki et al, NTT report of Research in Practical Use 1986, Vol. 35, No. 2, pages 191-197, so that the detailed description therefore is omitted.

Figure 5:
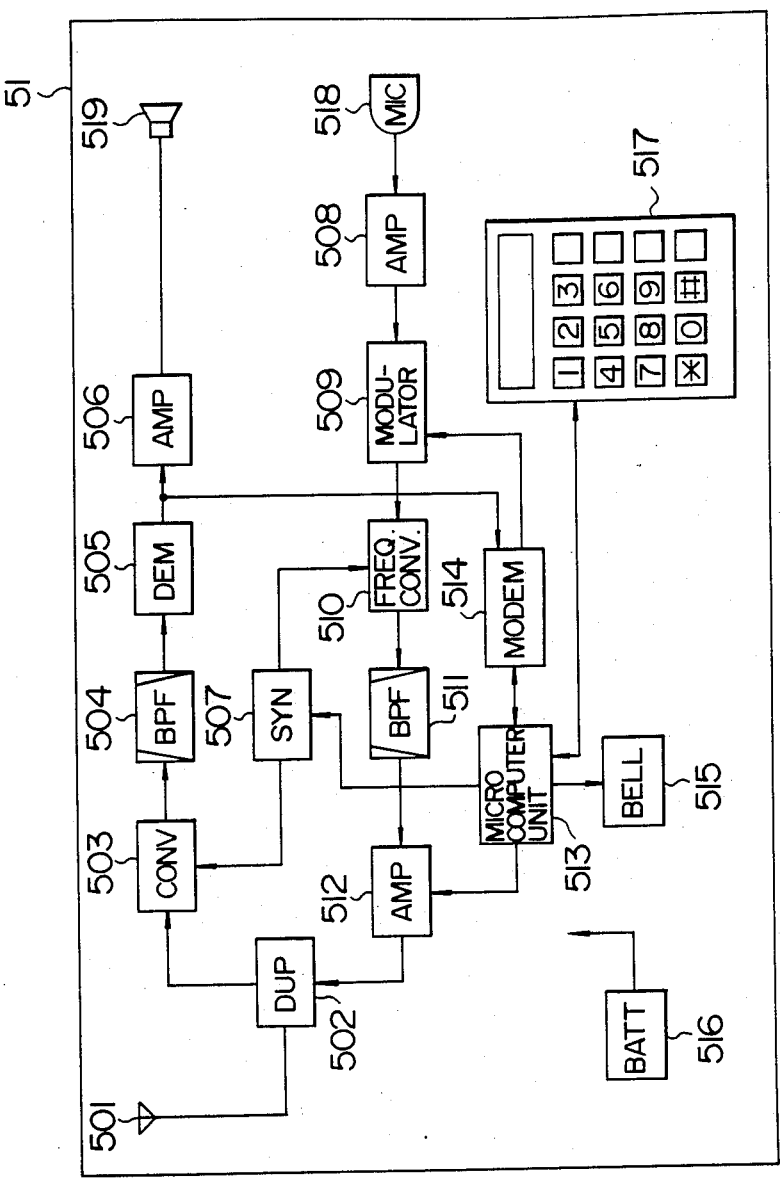
FIG. 5 shows an embodiment of the arrangement of a portable subscriber station or transceiver.

FIG. 5 is a block diagram showing an example of a subscriber station. In the figure, the subscriber station includes an antenna 501, a duplexer 502, a frequency synthesizer 503, a band-pass filter 504, a detector 505, and audio amplifier 506, a frequency synthesizer 507, a microphone amplifier 508, a modulator 509, a frequency converter 510, a band-pass filter 511, a radio frequency amplifier 512, a microcomputer unit 513, a modem 514 for digital signals, a sound generator 515 such as a bell or a buzzer informing a call reception, a battery 516 for powering the subscriber station, a dial pad and display section 517, a microphone 518 and a loudspeaker 519.

The structure of the subscriber station is also the same as that of a conventionally known radio mobile station, as shown in, for example, "Cordless Telephone Equipment Meeting CEPT Standards" by Nishihara et al. NEC Res. & Develop., No. 82, July 1986, pages 104-109 so that the detailed description therefore is omitted.

The main operations of the portable wireless communication systems of this invention, i.e., the radio channel management, the call initiation and the hand-off process will now be described.

[Management of Radio Channels]

As discussed previously with FIG. 1, each base station 1 to 7 sequentially monitors radio channels allotted to the system at a time interval during which it does not communicate with any of the subscriber stations 51 and 52, and checks which channel is vacant or in use. Assuming that the number of channels assigned to the portable wireless communication systems of this invention is in the order of several tens, checking the radio channels is performed in accordance with the following procedure.

Figure 7:
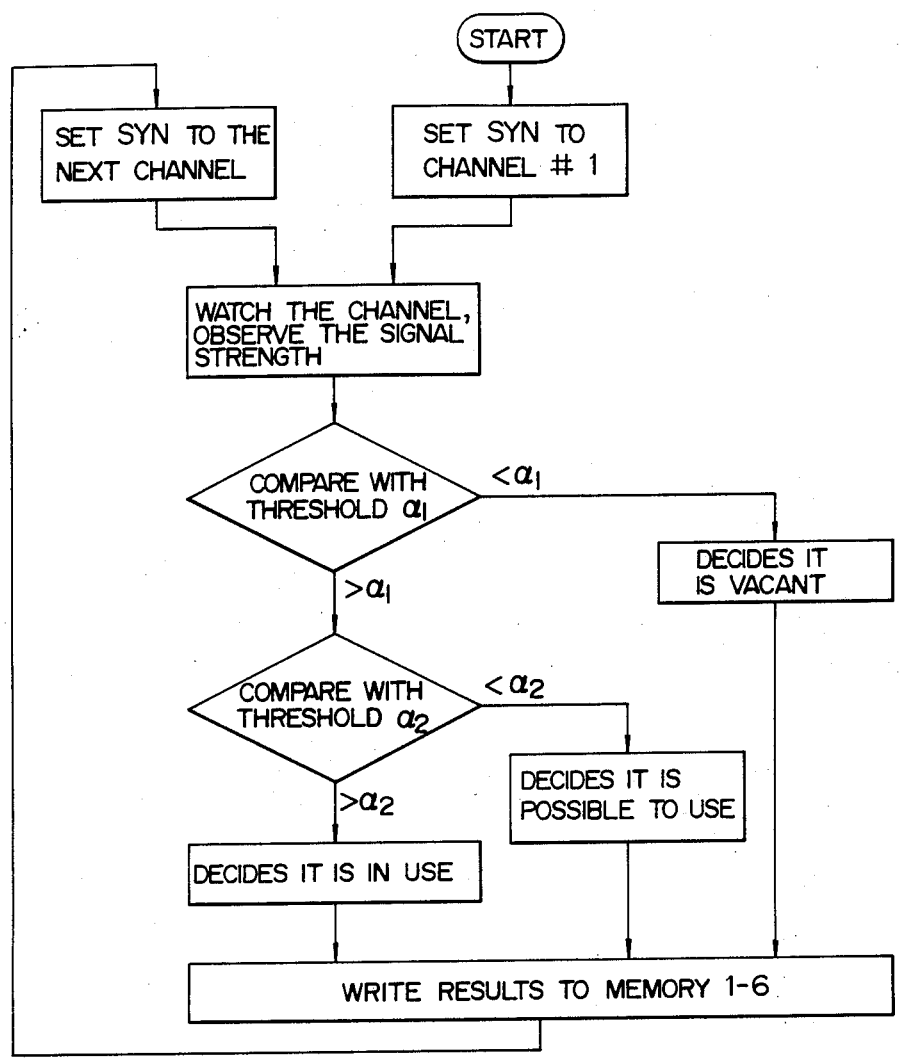
FIG. 7 is a flow chart illustrating the operation by a base station to obtain its control information.

First, the microcomputer unit 54 shown in FIG. 3 determines a channel check order in accordance with a predetermined order, and causes the frequency synthesizer 59 to set at the frequency of a radio channel in accordance with the channel check order. Thus, the amplifier 60 is allowed to receive the radio channel. The microcomputer unit 54 monitors an output from the receiver 60 to read a signal strength of the radio channel and store it in the memory 1-6. In this case, the received signal strength is compared with signal strength threshold values to judge if the radio channel is in use because of there is interference from other channels, can be used because of negligible interference or is vacant because of no signal from other channels. The result is stored in the memory 1-6. An example of stored results is shown in FIG. 6A, and a flow chart illustrating the check procedure is shown in FIG. 7. The check procedure is always performed continuously while the base station does not communicate with a subscriber station.

If a plurality of transceivers are present in a base station as shown in FIG. 3, it is possible to know the idle or busy status of radio channels in short time by operating in parallel all the receivers which do not communicate with a subscriber station.

Next, the controller 1-7 causes the monitored result (control information) of a base station exemplarily shown in FIG. 6A to be sent to neighbouring base stations and causes the monitor results of neighbouring base stations to be received, respectively via the data exchange transceiver 1-5 and the communication lines 46 and 47 at predetermined time intervals or every time the idle or busy status changes. The memory 1-6 stores the monitor results including the idle or busy status monitored by its own base station and the idle or busy status monitored by neighbouring base station, an example of which is shown in FIG. 6B.

An example shown in FIG. 6B illustrates the contents of the memory of the base station 1 wherein the base station 2 to 4 are registered as neighbouring base stations of the base station 1. It is assumed here that the other base stations are remotely located from the base station 1 and give no influence upon channel allocation of the base station 1.

In the above-described embodiment, the monitor results or control information data of channels have been described as being sent or received via the communication lines 46 and 47. However, as described previously, the monitor results may be sent or received via a path of the data exchange transceiver 1-5, the line 1-8 and antenna 53 shown in FIG. 3 by using a radio channel dedicated to such data exchange.

Figure 8:
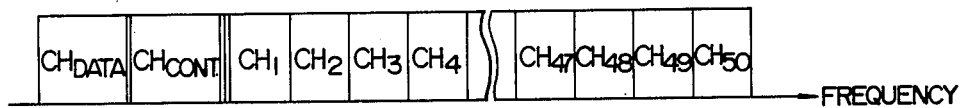
FIG. 8 shows radio channels used by a base station.

FIG. 8 shows one example of channel allocation wherein channels $CH_1$ to $CH_{50}$ are audio channels for telephone communication, channel $CH_{CONT}$ is a channel used for the control signals for a call initiation, a call reception, a hand-off and the like, and channel $CH_{DATA}$ is a channel used for the exchange of the control information data.

As a channel for exchanging the control information data, the control channel $CH_{CONT}$ may be used in common.

Since a plurality of base stations use the same frequency of the control information data exchange channel $CH_{DATA}$, a packet communication system with a well known CSMA (carrier sense multiple access) is preferable to be used for such data transfer.

As described previously, the control information data includes (1) an ID (identification) number of a base station, (2) a channel number whose channel is used in communication of a base station with a subscriber station, (3) a channel number whose channel is in use by another base station so that a base station concerned cannot use it due to the interference, (4) a signal strength of a subscriber station in case there is a transceiver unit communicating with the subscriber station, and (5) the degree of interference by which a radio channel is inhibited to be used.

Each base station sends and receives the control information at constant intervals or every time the control information changes, to thereby attend to the status of neighbouring base stations. In this case, if a signal strength is measured when the control information is received, an approximate distance to a neighbouring base station can be known based on the signal strength. It is apparent that the nearer the neighbouring base station is, the more a base station concerned receives the influence therefrom. Therefore, obviously the channel management can be effected more effectively if the received signal strength is used in weighting the control information data.

Next, the channel allocation scheme by a base station based on the control information will be described. When an additional radio channel becomes necessary for a base station to start communication with a subscriber station, e.g., when a base station receives a call request from a subscriber station, first the microcomputer unit 54 refers to the control information on its own base station and neighbouring base stations stored in the memory 1-6. Then, after searching the list of control information, a radio channel is selected which is vacant at its own base station and is in-use state, i.e., is impossible to use due to the co-channel interferer, at neighbouring base stations. If there are a plurality of radio channels meeting such conditions, selected is a radio channel which is vacant at its own base station and is in-use state at as many neighbouring base stations as possible. In the example shown in FIG. 6B, the radio channel No. 5 is selected since it is vacant at its base station and in-use state at two neighbouring base stations.

Following the above procedure, the base station assigned a new radio channel causes the frequency synthesizer 59 to be set at the frequency of the assigned radio channel No. 5 to start communication with the subscriber station. At the same time, the fact that the radio channel No. 5 has been occupied and now in use is declared to the neighbouring base stations via the controller 1-7. The declaration is constructed of digital signals in the form of packets including at least the ID number of the base station concerned and the channel number now in use.

The neighbouring base stations receiving the declaration monitor the radio channel stated in the declaration and checks the received signal strength of the radio channel to accordingly update the control information. Therefore, if the base station assigned the new radio station collects the control information from the neighbouring base stations after a certain time lapse after starting the use of the radio channel, the base station can be informed of the influence of its radio wave upon the neighbouring base stations. Namely, it can dynamically identify those neighbouring base stations within its interference area. As a result, even if radio propagation characteristics change and the size and shape of interference area of each base station fluctuates, the base station concerned in the portable wireless communication systems can autonomically recognize the configuration of interference area.

Next, the operation procedure of this embodiment will be described definitely, taking particularly the operations of call initiation and hand-off of a subscriber station as examples.

(a) Call Initiation from Subscriber Station

When an owner of a subscriber station sends a call initiation from the dial pad 517, the microcomputer unit 513 causes the synthesizer 507 to set at a frequency of the common control channel ($CH_{CONT}$) and causes the call initiation signal to be modulated by the modem 514 to thereby transmit it via the audio signal modulator 509, frequency converter 510, band-pass filter 511, radio frequency amplifier 512, duplexer 502 and antenna 501.

Figure 9:
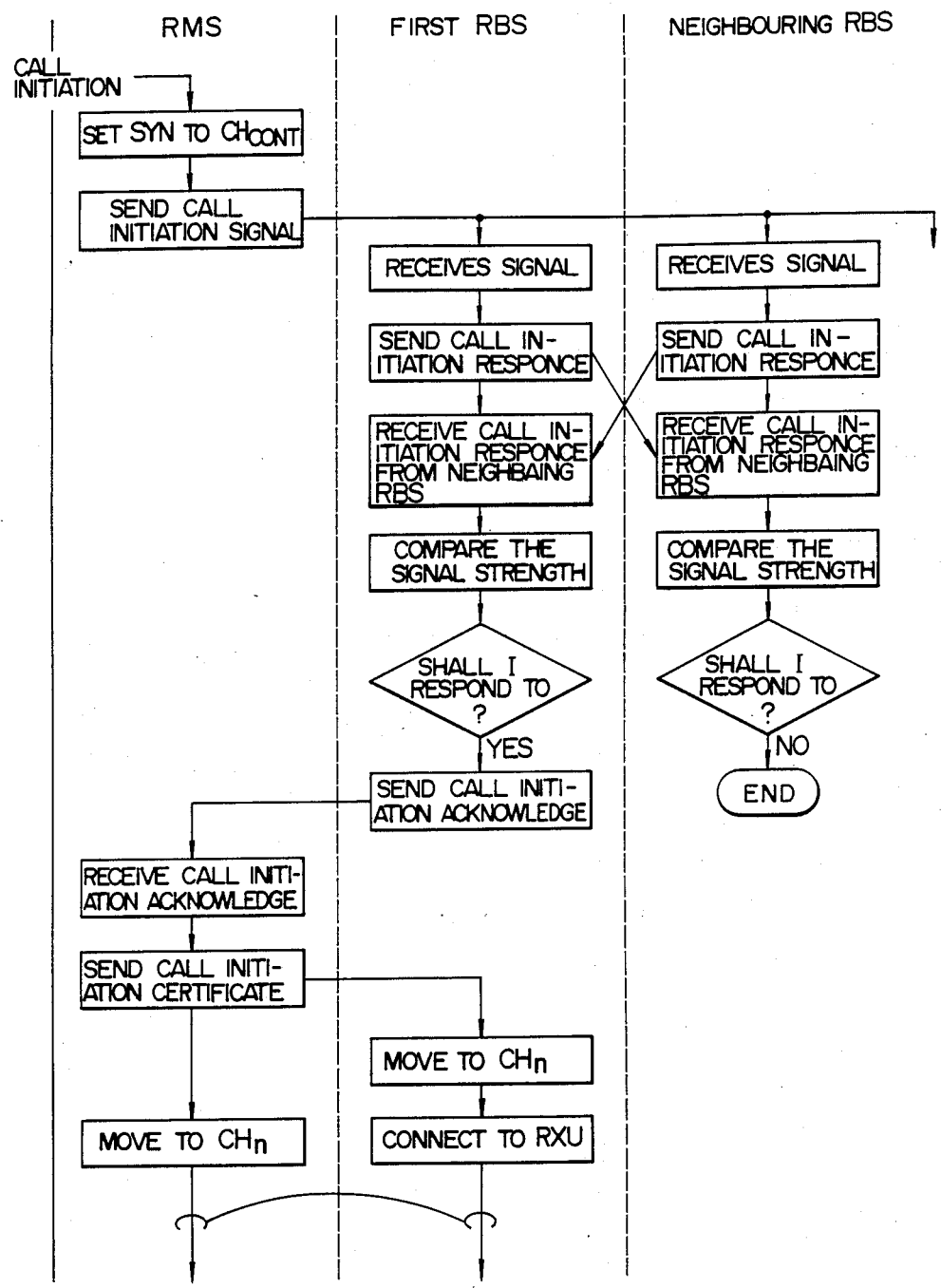
FIG. 9 is a flow chart illustrating a "call initiation" process in the portable wireless communication systems of this invention.

Referring to FIG. 9, the other base stations are monitoring the $CH_{CONT}$ through a vacant transceiver unit if they have such a vacant transceiver unit. Therefore, the call initiation signal is properly seized by a radio station having a vacant transceiver unit.

However, as described previously, there are many overlapped service areas of the base stations so that the call initiation signal may be seized by plural base stations. It is obvious that plural base stations cannot be allowed to respond to the call initiation signal at the same time. In this connection, the base stations seizing the call initiation, exchange data (call initiation response signal) regarding the seize status such as the strength of the call initiation signal. Based on the result of such exchange, each base station compares its seize status with those of neighbouring base stations and judges by itself if it should respond to the call initiation from the subscriber station. For a judgement criterion, the strength of a received call initiation signal is most suitable. However, other factors may be added in such judgement such as the number of vacant radio channels, the vacant status of transceiver units and the like. It is necessary however for all the base stations to follow the same criterion.

Since the destination base stations to which the call initiation response signal is directed cannot be identified, the call initiation response signal is subjected to error correction coding and broadcast to all neighbouring base stations. Even if such procedure is adopted, only a single base station cannot always respond to the call initiation from the subscriber station due to such as transmission error.

In view of this, when each base station judges that it should respond to the subscriber station, the former sends to the latter a call initiation acknowledge signal including the channel number to be used. For the case where the subscriber station receives call initiation acknowledge signals from a plurality of base stations, it is arranged such that the subscriber station returns a call initiation certificate signal to the base station which first responded to the call initiation signal. If alternatively there is no call initiation acknowledge signal from any base station, it is arranged such that the subscriber station sends again a call initiation signal.

Next, the subscriber station receiving the call initiation certificate signal moves to the radio channel designated by that signal. The base station sets the vacant transceiver unit at the designated channel and connects the subscriber station to the radio exchange.

At the time when a call initiation is established, the radio exchange performs no operation but simply connects the private branch exchange 19 thereto. The procedure of sending a dial signal after the establishment of a communication line between the subscriber station and the radio station does not differ at all from the case of a conventional cordless telephone, so that the description therefore is omitted.

(b) Hand-off

Figure 10:
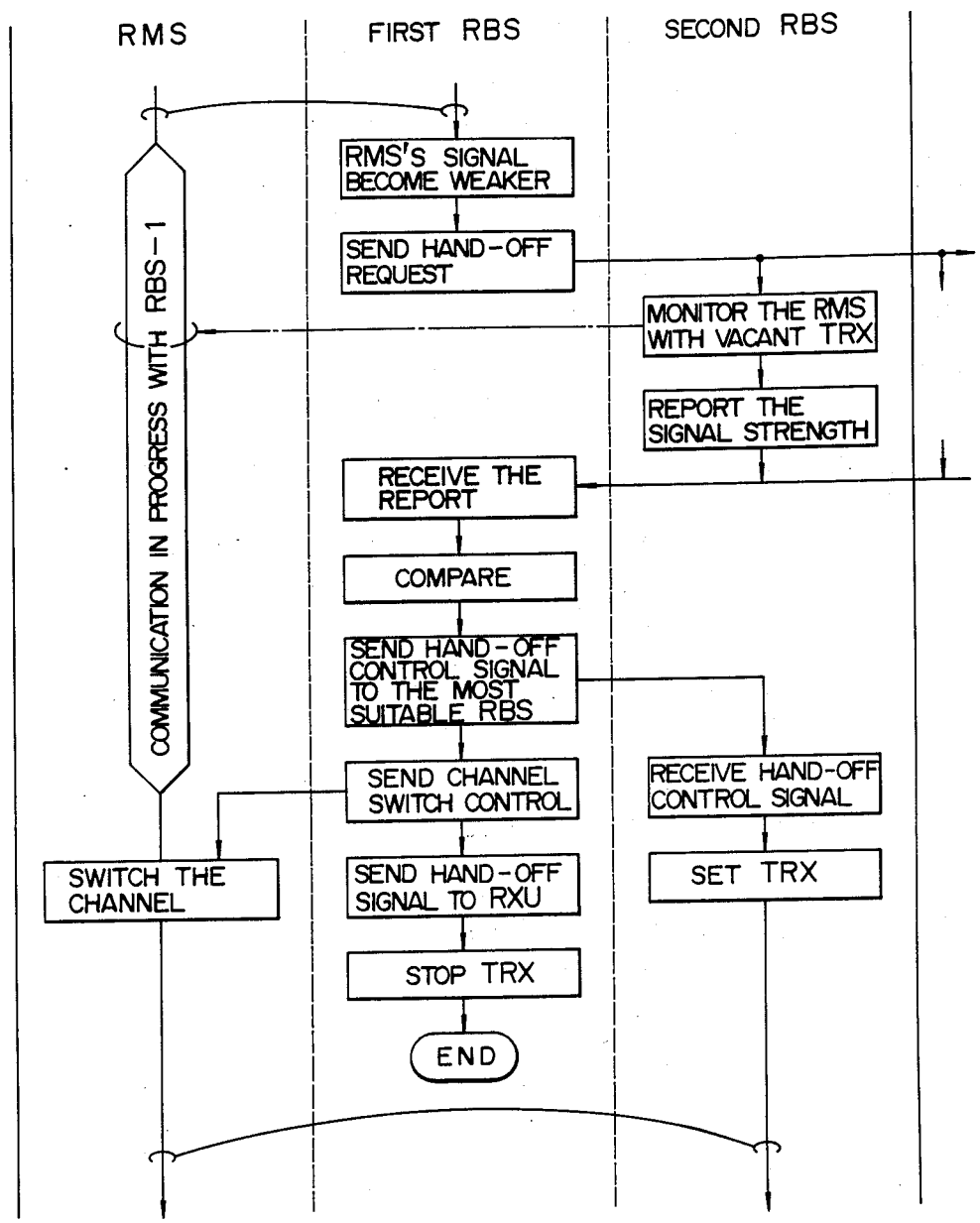
FIG. 10 is a flow chart illustrating a "hand-off" process in the portable wireless communication systems of this invention.

After starting communication between the subscriber station and the base station in accordance with the above-described procedure, it may happen that the location of the subscriber station moves out of the service area of the base station concerned. In this connection, the base station always monitors the signal strength of the subscriber station and, when the signal strength lowers, it requests another neighbouring base station to relay the subscriber station. To this end, a first base station now in communication with the subscriber station broadcasts, a hand-off request signal to neighbouring base stations using a predetermined radio channel (refer to FIG. 10). The contents of a hand-off request signal include the channel number by which channel the communication with the subscriber station is in progress, the signal strength of the subscriber station, the ID number of the subscriber station and the like.

A second base station receiving the hand-off request signal from the first base station monitors the subscriber station, checks the signal strength of the subscriber station and resultantly returns a hand-off response signal, by using a vacant transceiver unit if present in the second base station. Alternatively if not present, the second base station may not respond or may return a signal reporting that it cannot respond. If the monitor result of the subscriber station by using a vacant transceiver unit leads to a judgement that the signal strength is not sufficient for communication, the hand-off response signal is also sent back.

The first base station having broadcast the hand-off request signal compares hand-off response signals returned from neighbouring base stations, selects a base station which has seized a signal from the subscriber station at a strongest level, and sends a hand-off control signal thereto. At the same time, the first base station notifies the subscriber station to the effect that a hand-off will be performed, by using the radio channel now in use in communication with the subscriber station. Further, the first base station notifies the radio exchange the ID number of the base station to which communication is handed off, and requests the radio exchange to exchange lines. The hand-off is completed by the above-described procedure.

The above description has been directed to a call initiation, management of radio channels and hand-off. For the call reception procedure although not described, a conventional known system, as shown in, for example, "Improved Cordless Telephone Set" by Kato et al, NTT Equipment, December 1985, pages 102–108, may be used.

Namely, prepared in a PBX is a dedicated memory which stores the ID number of each base station near portable transceivers (subscriber stations) in the form of "location registration". Upon a call reception, a portable transceiver of an objective subscriber station is called from the registered base station.

As described so far, each base station densely exchanges data regarding the use status of radio channels with neighbouring base stations so that each base station can autonomically perform channel management. Thus, it becomes unnecessary to install a base station supervising and managing the whole system. Further, each station can predict the degree of interference influencing other base stations while communicating with a subscriber station, thus resulting in efficient frequency allocation.

Furthermore, since each base station dynamiclly manages the radio channels and service area, it becomes unnecessary to change the positional arrangement of base stations even in the indoor layout, where radio propagation characteristics or the like often changes.

What is claimed is:

1. A wireless communication system comprising:
   a plurality of base stations each disposed to cover a predetermined area for wireless communications;
   a subscriber station movable within any of said predetermined areas and capable of communicating via radio propagation with the base station covering said predetermined area when said subscriber is positioned therein;
   a dedicated line provided between adjacent base stations for exchanging information regarding the status of communication by the respective adjacent base stations;
   radio exchange means connected between said base stations and other communication systems for exchanging communication between said other communication systems and any of said base stations;
   wherein each of said base stations further comprises means for storing control information including information of status of communication by that base station and information of status of communication of adjacent base stations communicated through said dedicated lines, judging means for determining when a call from the subscriber station is received whether the base station covering the predetermined area into which the subscriber station has moved should respond to the call based on the control information stored in said storing means, and means responsive to said judging means having determined that said call should be responded to by one of said base station for selecting a radio channel by which said subscriber station performs communication based on said control information.

2. A wireless communication system according to claim 1, wherein said control information stored in each of the base stations includes at least:
   an identification number for the selected base station;
   a channel number indicating each of the radio channels assigned to each of the base stations which are presently used by said selected base station; and
   a channel number indicating each of those channels, among the assigned channels, which are used by any of the adjacent base stations and not allowed to be used by said selected base stations.

3. A wireless communication system according to claim 1, wherein said dedicated line is a radio channel.

4. A wireless communication system according to claim 3, wherein said each of the base stations comprises means for measuring the strength of a signal conveying said control information of each of the adjacent base stations connected through the associated radio channel, the measured strength of the signal being used for weighting the information of each of the adjacent base stations as communicated.

5. A wireless communication system according to claim 1, wherein said dedicated line is a wire.

6. A wireless communication system according to claim 1, wherein said other communication system includes a private branch exchange connected to said exchange means and wire telephone sets present in said pre-determined area.

7. A wireless communication method for performing communication between a radio transceiver and any of a plurality of base stations disposed so as to cover a predetermined area for wireless communication via a selected one of a plurality of radio channels assigned to each of said base stations, said method comprising the steps, carried out by each of the base stations, of:
   checking the status of the radio channels of a base station and storing the checked status as internal information;
   transmitting the internal information of said base station to adjacent base stations and receiving the internal information of each of said adjacent base stations via a dedicated line provided between said base station and said adjacent base station, and storing said received internal information of said adjacent base stations together with the internal information of said base station, as control information;
   judging in response to a received call from said radio transceiver whether said base station should respond to the call or not based on the stored control information;
   selecting on the basis of said response one of said radio channels of said selected base stations for communication with the radio transceiver; and
   performing communication with the radio transceiver through the selected radio channel.

8. A wireless communication method according to claim 7, wherein said control information includes an identifier number of that base station and information of each of the radio channels as to whether the radio channel is used by any of the adjacent base stations, or not and whether the radio channel used by any adjacent base station cannot be used by that base station due to interference with the use of the adjacent base station or can be used by that base station due to negligible interference, and wherein the radio channel which is not used by any of the adjacent base stations and the radio channel which is used by any adjacent base station but can be used by that base station due to negligible interference are selected preferentially in that order to be used for communication with the radio transceiver.

9. A wireless communication method according to claim 7, wherein said judging step includes the substeps of:
   sending a call acknowledge signal upon receiving the call from the radio transceiver to the adjacent base stations and receiving call acknowledge signals sent from any of the adjacent base stations; and
   judging whether that base station should respond to the received call or not with reference to the call acknowledge signals received from the adjacent base stations.

10. A wireless communication method according to claim 7, further comprising the steps, carried out by each of the base stations, of:
   sending, when signal strength in communication with the radio transceiver through the selected radio channel becomes lower, to at least one of the adjacent base stations and hand-off request signal including an identifier number of the radio transceiver, said signal strength and a number of the radio channel as used;

monitoring, when receiving such a hand-off request signal from any of the adjacent base stations, said received hand-off request signal and sending to the adjacent base station from which said hand-off request signal is received a hand-off response including data indicative of signal strength of the monitored hand-off request signal; and selecting, when receiving such hand-off response signals from more than one of the adjacent base stations, one of the more than one adjacent base stations to which the communication with the radio transceiver is to be transferred by comparison between said data included in said received hand-off response signals according to a predetermined rule, and sending to said selected one adjacent base station a hand-off control signal for requesting succeeding the communication with the radio transceiver.

11. A wireless communication method according to claim 10, further comprising the steps, carried out by each of the base stations, of:

sending, when receiving the hand-off request signal from any of the adjacent base stations and that base station is impossible to succeed the communication with the radio transceiver, a signal rejecting the hand-off of communication in place of said hand-off response signal.

12. A wireless communication method according to claim 10, further comprising the steps, carried out by each of the base stations, of:

continuing the communication with the radio transceiver when that base station receives no hand-off response signal from any of the adjacent base stations after sending the hand-off request signal for a predetermined time interval and then again sending the hand-off request signal to the adjacent base stations.

* * * * *